United States Patent [19]

Vinciarelli

[11] Patent Number: 4,648,020

[45] Date of Patent: Mar. 3, 1987

[54] POWER BOOSTER SWITCHING AT ZERO CURRENT

[75] Inventor: Patrizio Vinciarelli, Boston, Mass.

[73] Assignee: Vicor Corporation, Andover, Mass.

[21] Appl. No.: 705,546

[22] Filed: Feb. 26, 1985

[51] Int. Cl.$^4$ .............................................. H02M 7/00
[52] U.S. Cl. ....................................... 363/71; 363/97; 323/272
[58] Field of Search .................... 363/71, 97; 323/271, 323/272

[56] References Cited

U.S. PATENT DOCUMENTS

4,194,147 3/1980 Payne et al. .......................... 323/272
4,415,959 11/1983 Vinciarelli ............................ 363/21
4,425,613 1/1984 Shelly .................................... 363/71

Primary Examiner—Patrick R. Salce
Assistant Examiner—Anita M. Ault

[57] ABSTRACT

A power booster module for use in a zero-current switching converter array which includes a signal pulse train generator external to the power booster module, the pulse train having a frequency corresponding to the frequency of energy transfer cycles occurring in the array, the power booster module including a zero-current switching converter and a control input port to which the pulse train is applied to trigger energy transfer cycles in the booster module at the frequency of the pulse train, whereby the booster module operates coherently with the array to provide a share of the power drawn by a load.

17 Claims, 9 Drawing Figures

POWER BOOSTER SWITCHING AT ZERO CURRENT

BACKGROUND OF THE INVENTION

This invention relates to DC-to-DC power converters of the zero-current switching type.

In some such converters (for example the single-ended forward zero-current switching converters of the kind disclosed in Vinciarelli, U.S. Pat. No. 4,415,959, incorporated herein by reference, or series-resonant converters, or other resonant converters), power from a DC source is converted by way of a series of quantized energy transfer cycles into power for delivery to a load. Each energy transfer cycle has a period governed by the time constant of a coupled effective inductance (L) and capacitance (C) in the circuit. A switching device is connected in series with the source. The switching device is switched on and off (at times of essentially zero current) by a controller involving a feedback loop which senses the voltage across the load. The feedback loop spaces the energy transfer cycles at such time intervals that the voltage across the load is kept at a desired level. The power rating of the converter depends on the values of L and C. Such converters typically provide up to 200 watts of power.

One approach to delivering more power is simply to scale up the electrical components.

Another approach is to operate an array of converter modules in parallel, but independently. Some of the modules in the array will then typically saturate, while others make up any shortfall in power needed by the load.

In a third approach, converters within the array are forced to share power but without having to switch coherently at the same frequency. Such incoherent master-slaves configurations lead to beat frequencies.

SUMMARY OF THE INVENTION

The invention is derived from the concept that the pulse by pulse energy quantization inherent in zero-current switching converters provide a mechanism for power sharing by an array of such converters.

The general feature of the invention is that a power booster module, comprising a zero-current switching converter, has energy transfer cycles triggered in response to a signal pulse train generated within an array of zero-current switching converters, whereby the power booster module may operate coherently within the array to provide a share of the current drawn by the load.

The preferred embodiments include the following features. The time duration of energy transfer cycles occurring in a power booster module, as defined by its equivalent inductance ($L_b$) and capacitance ($C_b$), corresponds to the time duration of energy transfer cycles occurring in other modules within the array. This is provided for by specifying the same LC product for modules intended to be operated within the same array. This condition leads to power sharing between modules with a constant power ratio, the ratio itself being controlled by the capacitance ratio. In some embodiments there is a daisy chain array including a driver module and booster modules. The driver module contains the feedback loop sensing the voltage across the load and controlling the frequency of energy transfer cycles, which are time delayed along the chain to reduce ripple and noise. In other embodiments there is a phased array of booster modules driven through a phase shifter to minimize ripple and noise.

Such time or phased controlled arrays of zero-current switching converters with matching energy transfer cycle time constants are effective in providing arbitrarily large amounts of power to a load through coherent power sharing by a sufficiently large number of modules.

Other advantages and features will become apparent from the following description of the embodiments, and from the claims.

DESCRIPTION OF THE PREFERRED EMBODIMENT

We first briefly describe the drawings.

Drawings

Structure and Operation

Figure 1:
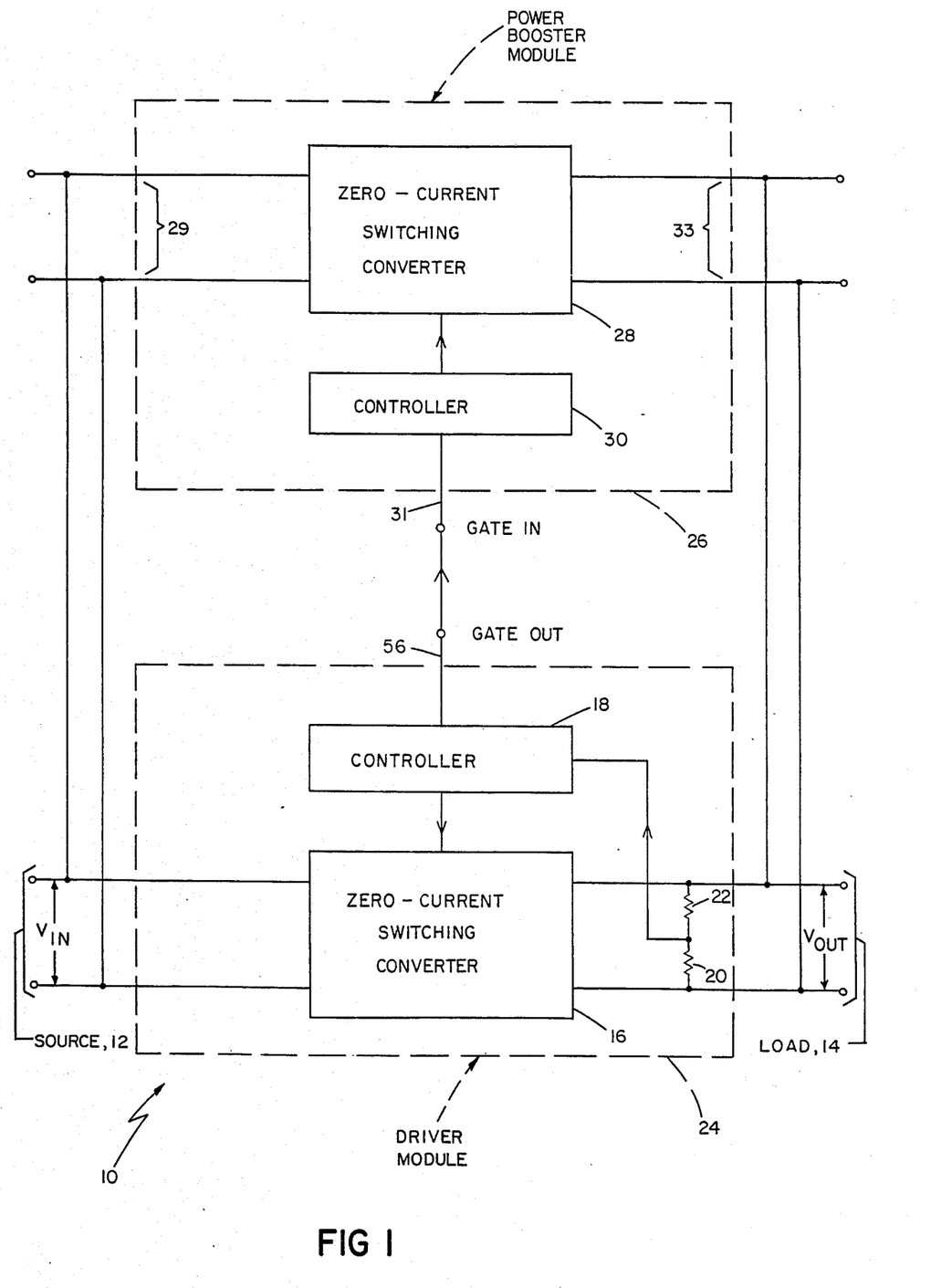
FIGS. 1, 2 are block diagrams of a power conversion system.

Referring to FIG. 1, a power converter system 10 converts DC power from a source 12 at an input voltage level ($V_{in}$) for delivery to a load 14 at an output voltage level ($V_{out}$). System 10 includes a zero-current switching converter 16 connected between source 12 and load 14, and a controller 18. Controller 18 has an input connected between a pair of series-connected resistors 20, 22 for sensing the voltage level across load 14 and an output connected to converter 16 for carrying switching signals to a switching device (not shown in FIG. 1) in converter 16. Converter 16, controller 18, and resistors 20, 22, together make up a driver module 24.

A power booster module 26 for increasing the amount of current deliverable to load 14 is connected in parallel with driver module 24. Power booster module 26 includes a zero-current switching converter 28 connected via input and output ports 29, 33, between source 12 and load 14, and a controller 30 whose output delivers switching signals to a switching device (not shown in FIG. 1) in converter 28. The input of controller 30 is connected via a control input port 31 to the output of controller 18 to receive a train of control pulses.

Figure 2:
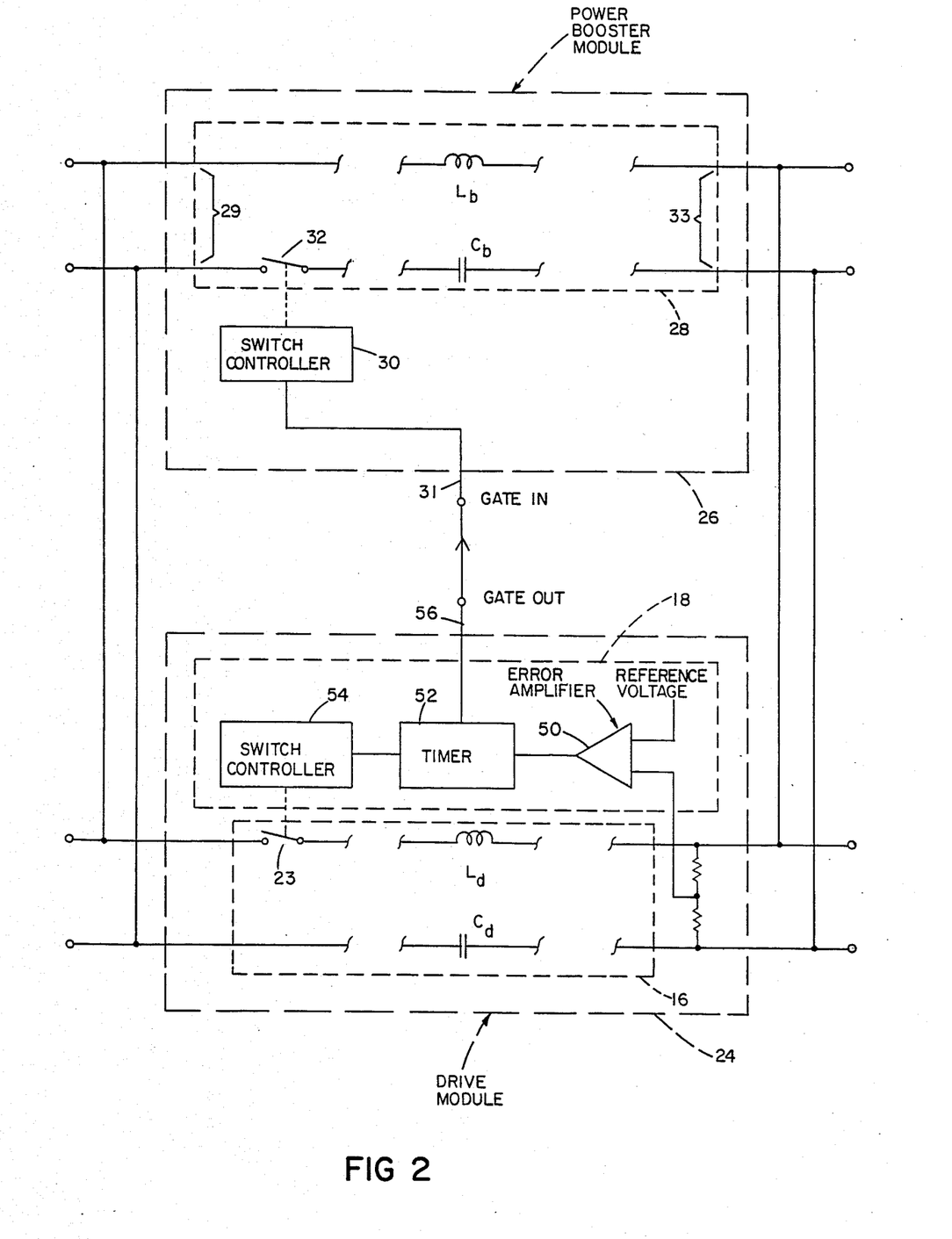

Referring to FIG. 2, converters 16 and 28 can be of the type which include one or more switching devices, for example, a switching device 23 in converter 16, and a switching device 32 in converter 28. Converters 16, 28 are characterized respectively by inductance and capacitance $L_d$, $C_d$ and $L_b$, $C_b$ which define characteristic time constants respectively of $\pi\sqrt{L_d C_d}$ and $\pi\sqrt{L_b C_b}$. In driver module 24, controller 18 includes an error amplifier 50 which compares the voltage at the load to a reference voltage and delivers a DC voltage output to a timer 52. Timer 52 generates pulses indicative of the intervals at which switches 23, 32 should be swiched on and off in order to maintain the voltage across the load at the desired level. Timer 52 is connected to a switch controller 54, which causes switch 23 to turn on and off at essentially zero current, and via a control output port 56 to controller 30 which, after a controlled time delay, causes switch 32 to turn on and off at essentially zero current.

Figure 3:
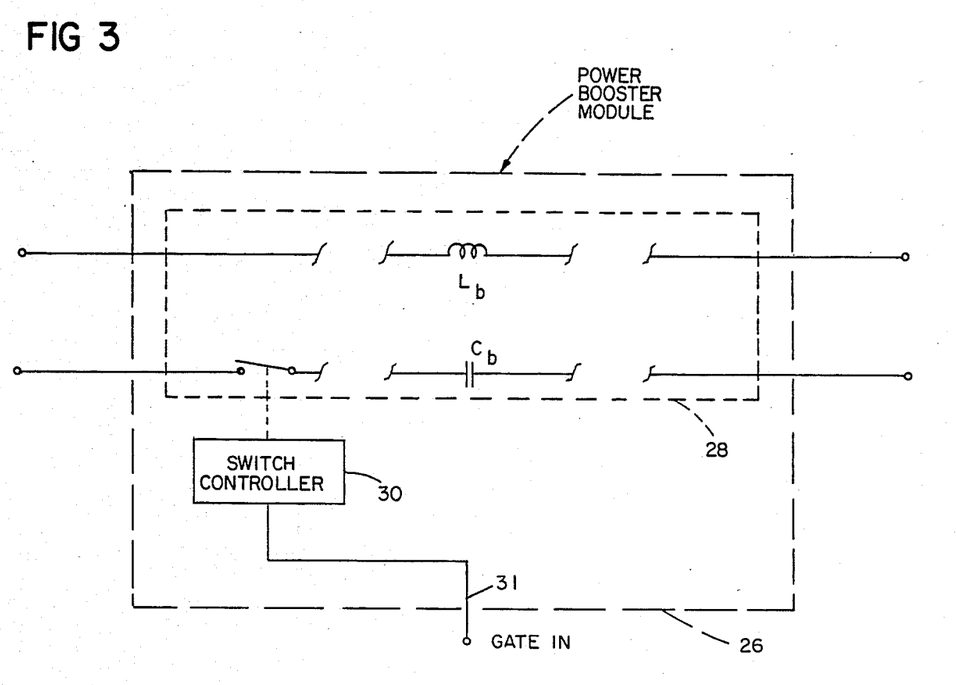
FIG. 3 is a block diagram of the power booster.
Figure 4:
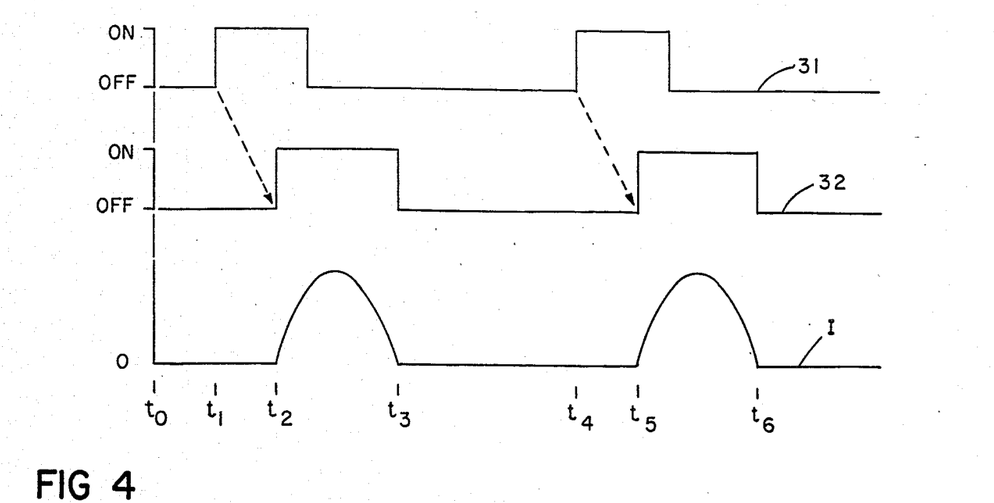
FIG. 4 is a timing chart for FIG. 3.

In operation, as shown in FIGS. 3, 4, in power booster module 26 at time $t_1$ a pulse is received by controller 30 from port 31. After a delay determined by the switch controller circuitry, at time $t_2$ controller 30 throws switch 32 on. The current I in converter 28 then rises and falls until at time $t_3$ it again reaches zero. Controller 30 senses this zero-current condition and at time $t_3$ throws switch 32 off. At time $t_4$ another pulse appears at port 31 and the steps are repeated. Thus the energy transfer cycles of converters 16, 28 occur at the same frequency but with a time delay between them.

Figure 5:
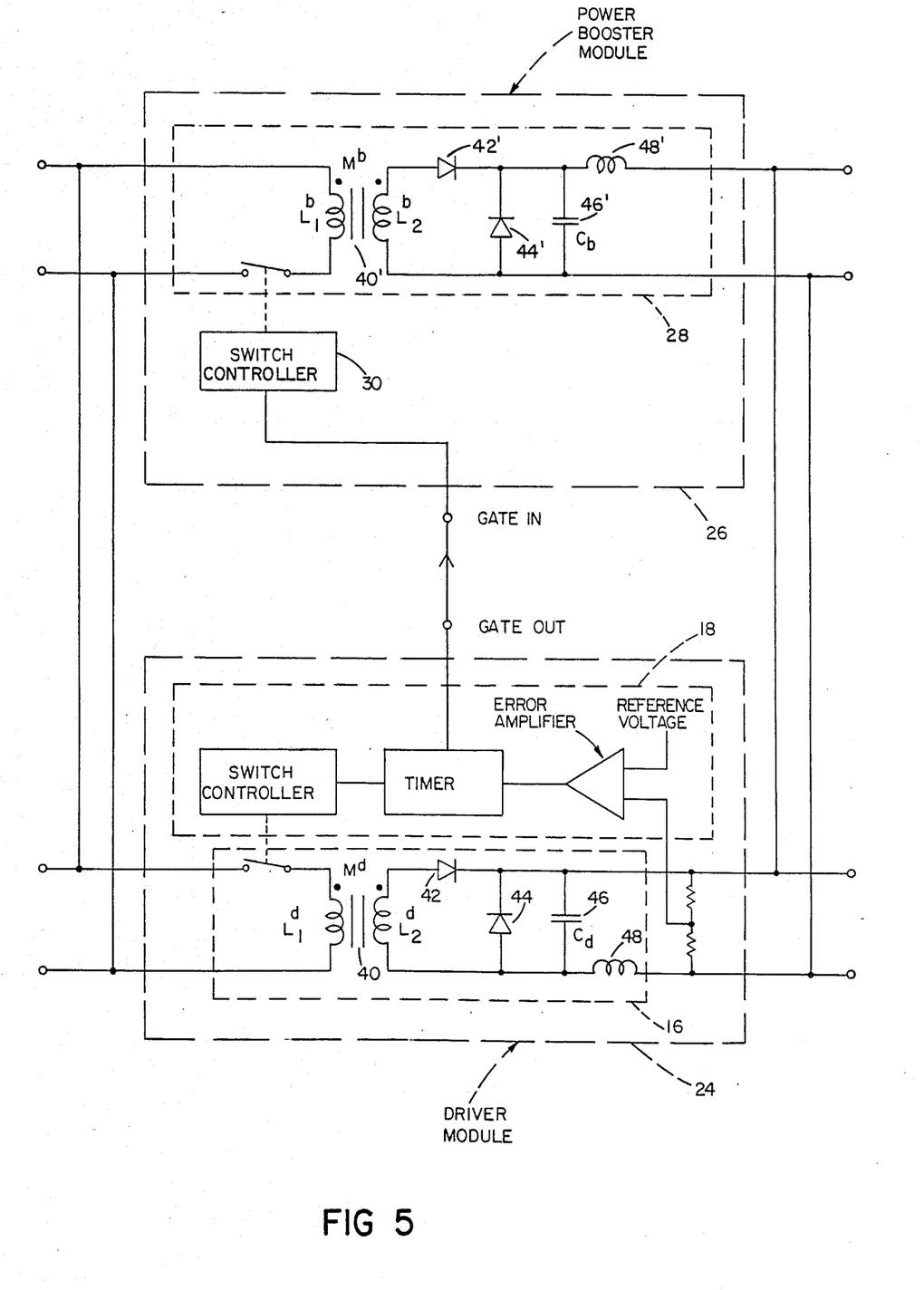
FIG. 5 is a power conversion system using converters of the forward, single ended type.

Referring to FIG. 5, converters 16, 28 can be of the forward, single-ended type disclosed in Vinciarelli, U.S. Pat. No. 4,415,959. The converters then respectively include transformers 40, $40^1$; rectifier diodes 42, 42; rectifier diodes 44, $44^1$; capacitors 46, $46^1$; and inductors 48, $48^1$. Transformers 40, $40^1$ are characterized respectively by primary winding self-inductances $L1_1{}^d$, $L1_1{}^b$, secondary winding self-inductances $L2_2{}^d$, $L2_2{}^b$, and mutual inductances $M^d$, $M^b$. The transformers are also chracterized by secondary leakage inductances $L2^d{}_e = (L_1{}^d L_2{}^d - M^{d2})/L_1{}^d$, $L2^b{}_e = (L_1{}^b L_2{}^b - M^{b2})/L_1{}^b$. In each converter, the secondary leakage inductance and the capacitance define characteristic time constants respectively of $\pi\sqrt{L_2{}^d{}_e C_d}$, and $\pi\sqrt{L_2{}^b{}_e C_b}$. The transformers and capacitors in the two converters are specified so that the values of the time constants for the two are sufficiently close to provide for a natural sharing between the converters of the current to be supplied to load 14. The sharing is not necessarily 50/50 but rather corresponds to the ratio of the two capacitances.

Figure 6:
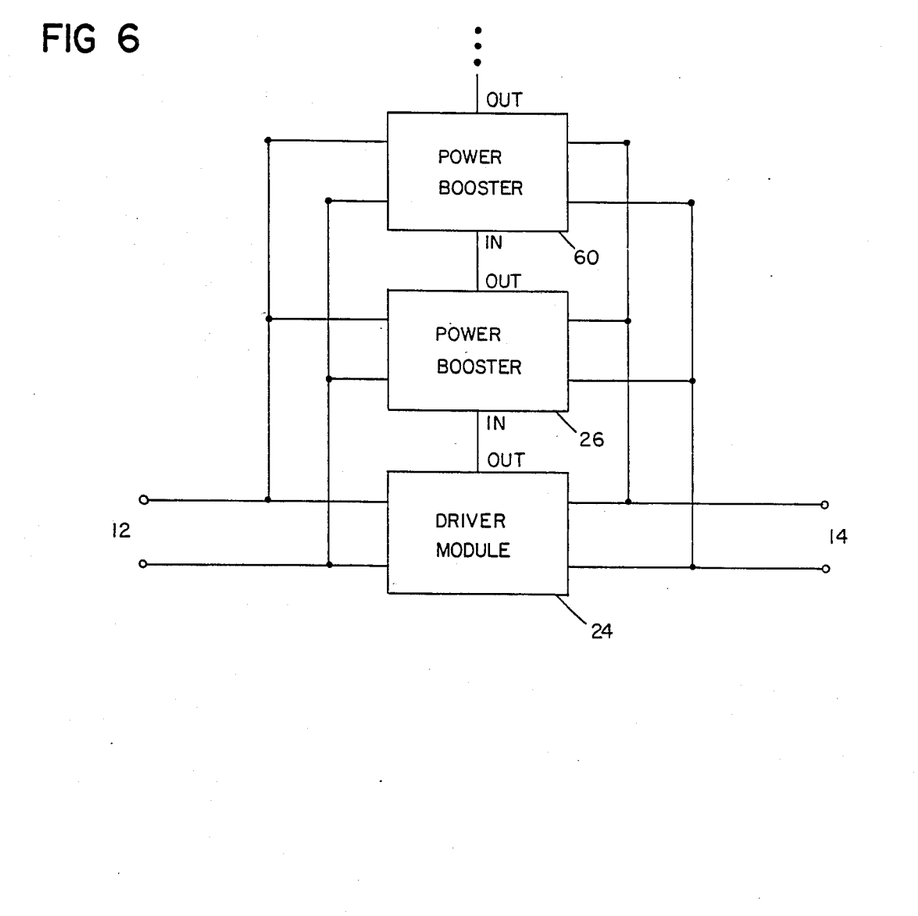
FIGS. 6, 7 are a block diagram of a daisy chain converter array and a related timing chart.
Figure 7:
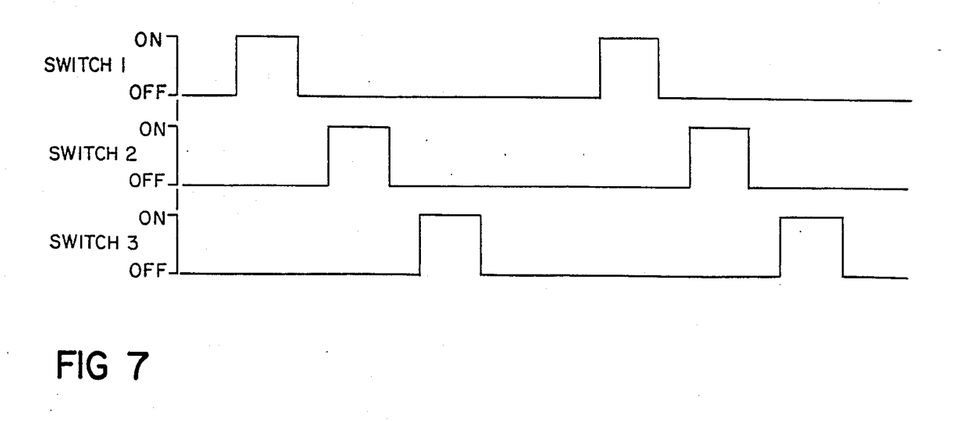

Referring to FIGS. 6, 7, the converter array can be extended to include one or more additional power boosters (for example, a power booster 60). The power boosters are arranged in a daisy chain such that each power booster 60 delivers to the next power booster in the chain a signal pulse train corresponding to the occurrences of the energy transfer cycles in the earlier power booster. And each power booster has each of its own energy transfer cycles triggered in response to (but delayed after) each signal pulse in the train from the prior booster in the chain. FIG. 7 shows the resulting states of the switches 1, 2, and 3 in modules 24, 26, 60, respectively.

Thus, larger amounts of power (limited only by the number of modules) can be delivered to the load. The load current is shared naturally. Ripple and noise are reduced. .

OTHER EMBODIMENTS

Other embodiments are within the following claims.

Figure 8:
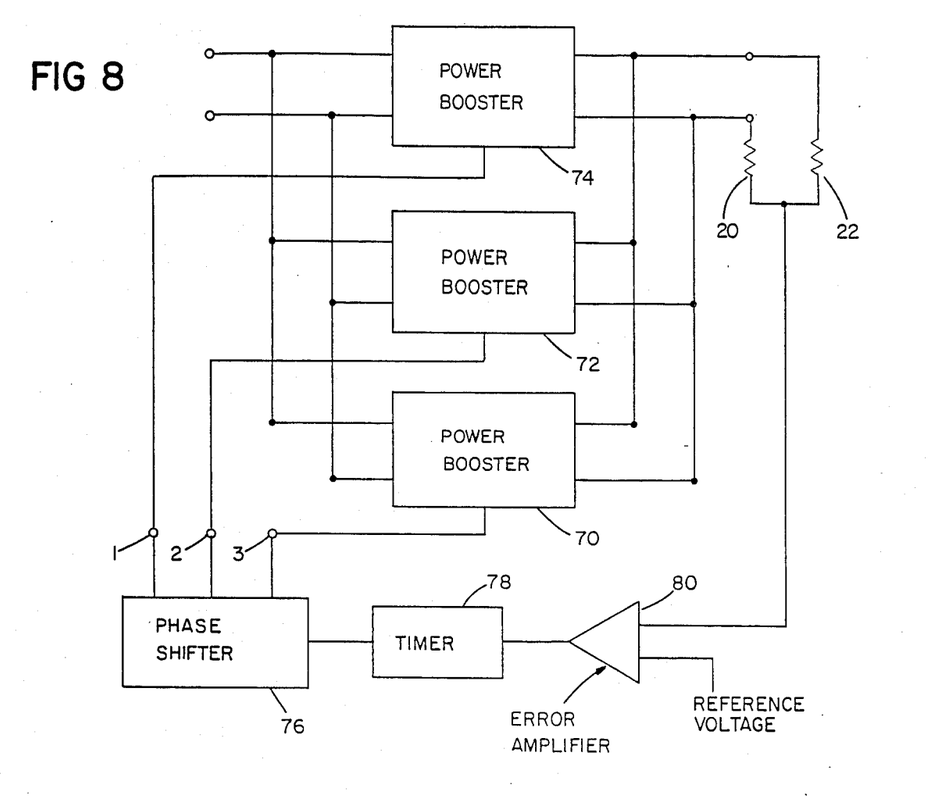
FIGS. 8, 9 are a block diagram of a phase controlled converter array and a related timing chart.
Figure 9:
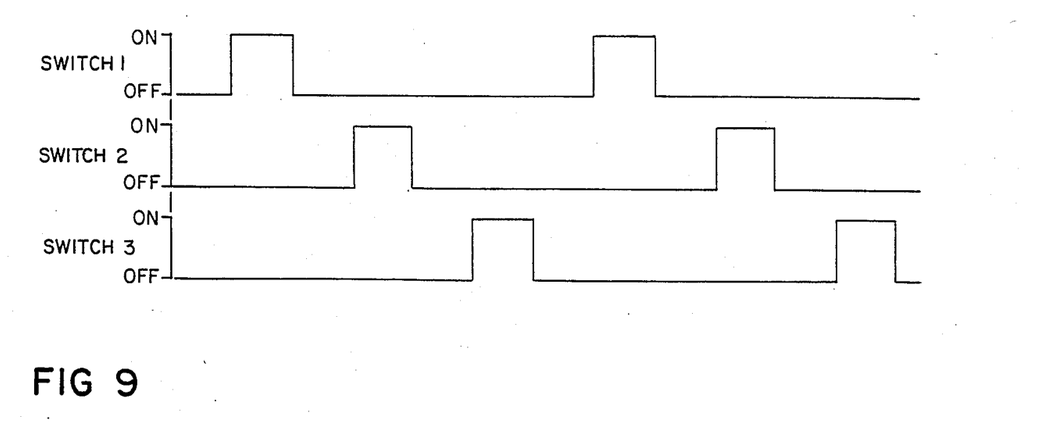

For example, referring to FIGS. 8, 9, a power converter array can be formed of any number N of identical power boosters (for example, boosters 70, 72, 74). The control input port of each booster is connected to a phase shifter 76 which receives from a timer 78 (like timer 52) pulses indicative of the intervals at which switches 1, 2, 3 (respectively in boosters 74, 72, 70) should be switched on. Phase shifter 76 then delivers a switch-triggering signal pulse train to each of the boosters to trigger the switching. As shown in FIG. 9, the switching in the different boosters is phase-arrayed at intervals of 360/N degrees.

I claim:

1. A power booster module for use with a zero-current switching converter array which converts power from a source for use by a load, and includes a signal pulse train generator external to said power booster module, said pulse train having a frequency corresponding to the frequency of energy transfer cycles occurring in said array, said power booster module comprising
   an input power port for connection to said source,
   an output power port for connection to said load,
   a zero-current switching converter connected to receive power via said input power port from said source and to deliver power via said output power port to said load in a series of quantized energy transfer cycles,
   a control input port for connection to said array, and
   a controller for triggering the onset of said energy transfer cycles in said booster module in response to said pulse train, and for terminating each said energy transfer cycle at a time determined by zero-current switching of said power booster module, whereby said booster module operates coherently with the array to provide a share of the current drawn by said load.

2. The power booster module of claim 1 wherein said booster module is characterized by having an equivalent inductance ($L_b$) and a capacitance ($C_b$) which define a characteristic time constant for said energy transfer cycles of said boost module, and said characteristic time constant is sufficiently close to the time constants of said energy transfer cycles of said array to provide a natural sharing of said current drawn by said load.

3. The power booster module of claim 2 wherein said array comprises a driver module which is characterized by having a driver capacitance ($C_d$) and wherein $C_b$ is chosen so that the ratio $C_b/C_d$ defines the sharing of the current drawn by said load.

4. The power booster module of claim 3 wherein said booster module provides a different proportion of said drawn current than does said driver module.

5. The power booster module of claim 1 wherein the triggering of said energy transfer cycles in said booster module is phased relative to the triggering of said energy transfer cycles in said array to reduce ripple in the voltage to said load.

6. The power booster module of claim 1 further comprising means for providing a signal pulse train corresponding to said energy transfer cycles occurring in said booster module for delivery to an additional power booster module to coordinate the energy transfer cycles which occur respectively in said booster module and in said additional booster module.

7. The power booster module of claim 6 adapted for use with a zero-current switching array having
   a plurality of other power booster modules arranged in a daisy chain, each of which delivers power to said load in a series of energy transfer cycles, the energy transfer cycles in each said power booster module being triggered in response to a pulse train provided from one of said other power booster modulues.

8. The power booster module of any of claims 1–7 wherein said zero-current switching converters are of the single-ended, forward type.

9. The power booster module of any of claims 1–7 wherein said zero-current switching converters are of the resonant type.

10. A power conversion array for converting power from a source for use by a load, said array comprising
 at least two zero-current switching converters each having a characteristic time constant, and
 means for triggering the onset of quantized energy cycles by said converters, said energy cycles being terminated within each converter at a time determined by zero-current switching, the respective time constants of said converters being sufficiently close to provide a natural sharing of current drawn by said load.

11. The power conversion array of claim 10 wherein said time constant of each converter is determined by an inductance and a capacitance, said capacitances of said converters being selected to provide a desired sharing of the current drawn by said load.

12. The power conversion array of claim 10 wherein said onsets of quantized energy cycles in respective said converters are phased to reduce ripple in the voltage to said load.

13. The power conversion array of claim 12 further comprising
 phase control circuitry which provides a plurality of phased-array pulse trains to respective said converters.

14. The power conversion array of claim 10 wherein said converters are daisy chained such that each converter is triggered from a preceding converter in said chain and triggers a succeeding converter in said chain.

15. The power conversion array of claim 13 wherein said converters are phased at 360/N degrees intervals, where N is the number of said converters.

16. The power conversion array of any of claims 10–15 wherein each said converter is of the single-ended, forward type.

17. The power conversion array of any of claims 10–15 wherein each converter is of the resonant type.

* * * * *

UNITED STATES PATENT AND TRADEMARK OFFICE
CERTIFICATE OF CORRECTION

PATENT NO. : 4,648,020

DATED : March 3, 1987

INVENTOR(S) : Patrizio Vinciarelli

It is certified that error appears in the above-identified patent and that said Letters Patent is hereby corrected as shown below:

Col. 3, line 19, "42, 42;" should be --42, $42^1$;--.

Col. 3, line 22, "$Ll_1^d$, $Ll_1^b$," should be --$L_1^d$, $L_1^b$,--.

Col. 3, line 23, "$L2_2^d$, $L2_2^b$," should be --$L_2^d$, $L_2^b$,--.

Co. 4, line 28, "boost" should be --booster--.

Signed and Sealed this

Second Day of January, 1990

*Attest:*

JEFFREY M. SAMUELS

*Attesting Officer*     *Acting Commissioner of Patents and Trademarks*